Dec. 29, 1931.  H. C. EDDY  1,838,913
DEHYDRATOR
Filed July 11, 1927
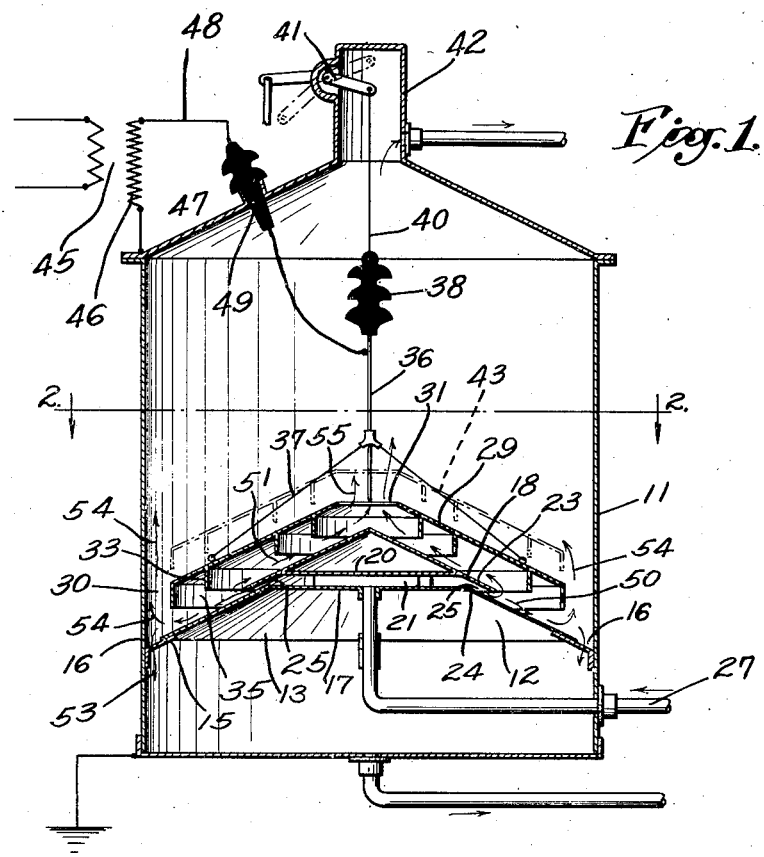
Fig. 1.
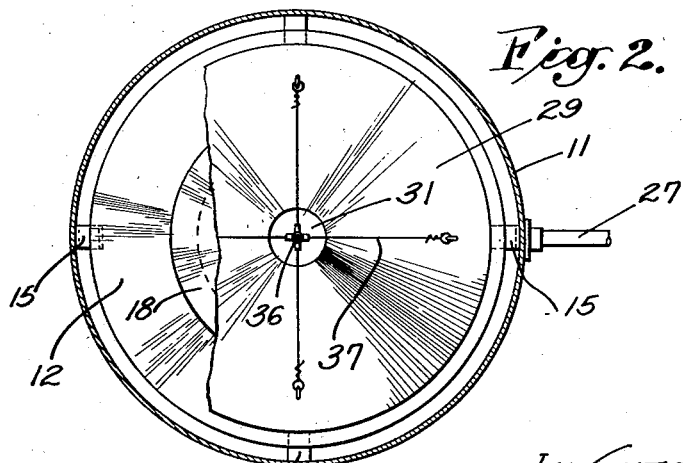
Fig. 2.
INVENTOR
HAROLD C. EDDY
By
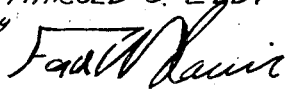
ATTORNEY Patented Dec. 29, 1931

1,838,913

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

DEHYDRATOR

Application filed July 11, 1927. Serial No. 204,717.

My invention relates to apparatus for separating the phases of an emulsion, and it has a particular use in the oil producing industry. In the following description the invention will be presented in a form of apparatus for use in the oil producing industry. It should be understood, however, that I do not intend to limit the invention to that particular art.

Oil very often becomes associated with water particles and a petroleum emulsion is formed. Before petroleum is commercially valuable, the water content must be reduced to at least less than two per cent. It is ordinary practice to pass petroleum emulsion through a dehydrator consisting of a pair of electrodes between which an electric field is established. The emulsion passes through this electric field wherein the water particles are agglomerated into masses which are of sufficient size to precipitate from the oil under the influence of gravity. A common form of dehydrator has a pair of cone electrodes, one placed above the other in a tank. The emulsion is usually introduced into the treating space between the electrodes at the central part. When using dehydrators of this character on emulsions containing gas, a gas pocket is formed at the central part of the treating space which tends to float the upper electrode away from the lower one, and consequently interferring with the proper action of the dehydrator.

It is an object of this invention to provide a treater in which no gas pocket will form in the treating space.

A further object of the invention is to provide a treater in which there will be a dual flow of emulsion through the electric field.

Further objects and advantages of the invention will be made manifest hereinafter.

Referring to the drawings in which I illustrate a preferred form of the invention:

Fig. 1 is a vertical cross-section.

Fig. 2 is a horizontal cross-section taken on the line 2—2 of Fig. 1.

The form of the invention shown in the drawings has a tank 11 in the lower part of which a lower or grounded electrode 12 is supported. The electrode 12 consists of a primary frusto-conical member 13 which is supported by the tank 11 by suitable brackets 15, there being an annular space 16 between the tank and the primary member 13. The upper and inner part of the primary member 13 is in the form of a flat plate 17. Supported above the primary member 13 is a secondary conical member 18 which comprises a part of the lower electrode 12. The secondary member 18 has a flat wall 20 which extends parallel to and above the wall 17 of the primary member 13 so as to provide a passage 21. The outer and lower edge 23 of the secondary member 18 projects around the upper part 24 of the primary member 13, thus forming a downward directed and outward directed annular mouth 25. Connected to the passage 21 is an emulsion supply pipe 27 which extends to the interior of the tank 11 through the wall thereof, as shown.

Supported above the lower electrode 12 is an upper live electrode 29 which is conical, as illustrated. The upper electrode 29 is of smaller diameter than the tank 11 so that an annular space 30 is formed therearound. The upper electrode 29 has a central opening 31. Projecting downward from the lower face of this upper electrode 29 are annular baffles 33.

The lower and upper electrodes 12 and 29 cooperate to provide a treating space 35 into which emulsion to be treated is passed.

The upper electrode 29 is supported by a central rod 36, the lower end of which is connected to wires 37 attached to the upper electrode 29, and the upper end of which is connected to an insulator 38. The insulator 38 is connected to a member 40 which is attached to a reciprocator 41, a part of which extends into a dome 42 of the tank 11. When the reciprocator is operated, the upper electrode 29 is moved from full line position into the position indicated by dotted lines 43 of Fig. 1.

An electric field is set up in the treating space 35 by means of an electric source such as the transformer 45 shown in Fig. 1. One side of a secondary 46 of this transformer 45 is connected by a conductor 47 to the tank 11 to which the lower electrode 12 is grounded, and the other side of which is connected by a conductor 48 which passes through an insulation bushing 49 of the tank 11 to the rod 36, thus being connected to the upper electrode 29.

The operation of the invention is as follows:

Emulsion to be treated is passed through the emulsion inlet pipe 27 to the passage 21. The emulsion passes outward through the passage 21 and will flow through the annular mouth 25 into the treating space 35 where an electric field is set up by the action of the transformer 45. The emulsion upon being introduced into the treating space 35 tends to divide and passes in two directions, one part of the emulsion will pass downward along the surface of the lower electrode 12 as indicated by arrows 50, and part of the emulsion will pass upward along the surface of the lower electrode 12 as indicated by arrows 51. The emulsion which passes downward is subjected to the action of the electric field so that the water particles are coalesced. The water particles may drop downward through the space 16 around the lower electrode as indicated by arrows 53, and the free oil will pass upward through the space 30 around the upper electrode 29 as indicated by arrows 54. The emulsion which passes upward in the treating space 35 is subjected to the action of the electric field so that the water particles are coalesced and will separate from the oil. The water particles drop onto the surface of the lower electrode 12 and pass downward therealong, finally dropping through the space 16. The oil of the emulsion passes upward through the central opening of the upper electrode 29, as indicated by arrows 55. During this treating action the upper electrode 29 is reciprocated between the two positions indicated in Fig. 1. This action prevents a chaining up of the water particles in the electric field and changes the intensity of the field since the intensity of the field varies inversely with the distance between the electrodes. The reciprocating of the upper electrode surges oil into and from the treating space through the central opening 31 and also causes a circulation of oil through the upper part of the treating space 35 above the emulsion which assists in preventing short-circuiting and furthermore assists in drawing part of the emulsion to be treated upward through the treating space.

In the foregoing description it will be seen in view of the fact that the central part of the upper electrode 29 is open, it is impossible for a gas pocket to form and there will, therefore, be no interference in this respect. By forming the annular mouth so that it is positioned half way between the inner and outer parts of the treating space it is assured that the emulsion will receive sufficient treating action to coalesce the water particles.

I claim as my invention:

1. A treater for breaking down emulsion, comprising: a tank having outlet means; a lower electrode in said tank, said lower electrod having an annular mouth; an upper electrode in said tank, there being a treating space between said electrodes and there being a space in said tank around said upper electrode, said upper electrode having a central opening; means for setting up an electric field in said treating space; means for delivering emulsion to said annular mouth; and means for reciprocating said upper electrode.

2. A treater for breaking down emulsion, comprising: a tank having outlet means; a lower electrode in said tank, said lower electrode having an outward directed annular mouth; an upper electrode in said tank, there being a treating space between said electrodes and there being a space in said tank around said upper electrode, said upper electrode having a central opening; means for setting up an electric field in said treating space; and means for delivering emulsion to said annular mouth.

3. A treater for breaking down emulsion, comprising: a tank having outlet means; a lower electrode in said tank, said lower electrode having an outward directed annular mouth; an upper electrode in said tank, there being a treating space between said electrodes and there being a space in said tank around said upper electrode, said upper electrode having a central opening; means for setting up an electric field in said treating space; means for delivering emulsion to said annular mouth; and means for reciprocating said upper electrode.

4. In a dehydrator, the combination of: a conical primary electrode comprising primary and secondary members spaced so as to form a passage therebetween, said members overlapping to form an annular mouth communicating with said passage; a conical secondary electrode cooperating with said primary electrode to define a treating space into which said mouth opens; and means for supplying fluid to said passage.

5. In a dehydrator, the combination of: a lower electrode comprising primary and secondary members defining an annular mouth, said primary member being frusto-conical and said secondary member being conical; a frusto-conical upper electrode spaced above said lower electrode, said upper electrode having a central opening therein; means for establishing a potential difference between said lower and upper electrodes; and means for delivering emulsion to said annular mouth.

6. In an electric treater, the combination of: a lower electrode including an annular mouth; an upper electrode cooperating with said lower electrode in defining a treating space on a central portion of which said annular mouth opens, said upper electrode having a central opening of much smaller diameter than said annular mouth whereby fluid introduced through said annular mouth flows through said treating space in two directions; means for establishing a potential difference between said lower and upper electrodes; and means for delivering fluid to said annular mouth.

7. In an electric treater the combination of: a lower conical electrode including an annular mouth; an upper conical electrode cooperating with said lower electrode in defining a treating space on which said annular mouth opens, said upper electrode having a central opening of much smaller diameter than said annular mouth whereby fluid introduced through said annular mouth flows through a portion of said treating space before passing through said central opening; means for establishing an electric field in said treating space; and means for delivering fluid to said annular mouth.

8. In an electric treater, the combination of: a primary electrode; a secondary electrode providing a central opening communicating with a treating space between said electrodes, said electrodes being submerged in a fluid; and means for reciprocating said secondary electrode whereby said fluid may freely surge into and out of said treating space through said opening.

9. In an electric treater, the combination of: a primary electrode; a secondary electrode providing a central opening communicating with a treating space between said electrodes, said electrodes being submerged in a fluid; means for reciprocating said secondary electrode whereby said fluid may freely surge into and from said treating space through said central opening; and means for introducing the fluid to be treated into said treating space at a section between said central opening and the outer edge of said secondary electrode.

In testimony whereof, I have hereunto set my hand at Los Angeles, California, this 1st day of July, 1927.

HAROLD C. EDDY.